July 31, 1962 — B. J. FRASCA — 3,047,155
COMBINED SEPTIC TANK AND FILTER
Filed Feb. 16, 1959 — 2 Sheets-Sheet 1

Benjamin J. Frasca
INVENTOR.

BY Clarence A. O'Brien
and Harvey B. Jacobson
Attorneys

July 31, 1962  B. J. FRASCA  3,047,155
COMBINED SEPTIC TANK AND FILTER
Filed Feb. 16, 1959  2 Sheets-Sheet 2
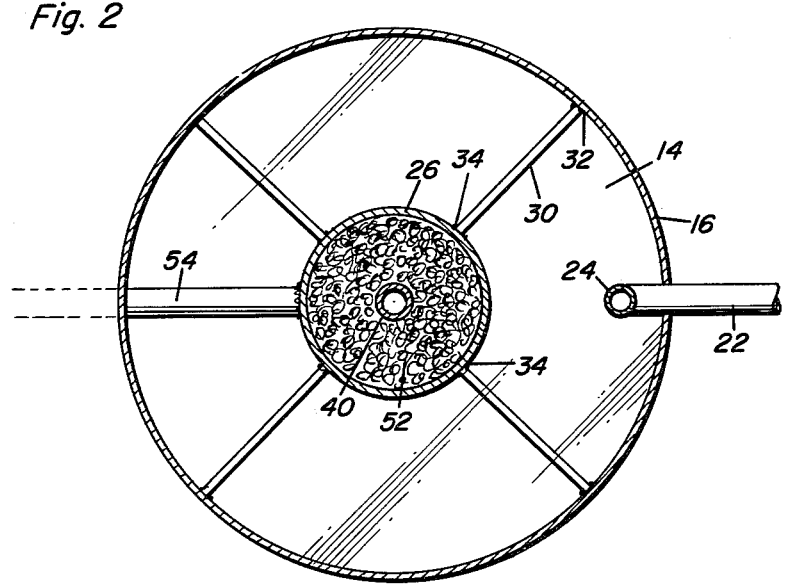
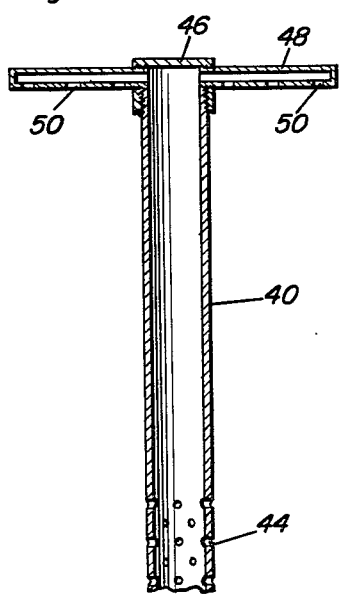
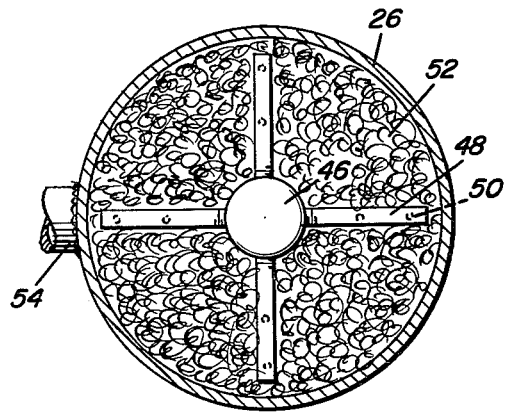
Benjamin J. Frasca
INVENTOR.

United States Patent Office 3,047,155
Patented July 31, 1962

3,047,155
COMBINED SEPTIC TANK AND FILTER
Benjamin J. Frasca, 9621 Goodwood Blvd.,
Baton Rouge, La.
Filed Feb. 16, 1959, Ser. No. 793,476
4 Claims. (Cl. 210—256)

The present invention generally relates to a sewage treatment plant and more particularly a combined septic tank and filter assembly which will effectively combine the function of the septic tank and provide for treatment of the effluent thereby providing an effective treatment for the sewage.

The primary object of the present invention is to combine a septic tank and filter in which a small inner compartment is disposed within the tank with the inner compartment having the outlet pipe connected thereto and a centrally disposed inlet pipe extending through the bottom and projecting upwardly into the inner compartment and terminating in a discharge spray pipe assembly whereby the liquids discharged from the septic tank will be sprayed onto a filter cartridge whereupon they will drain downwardly and then outwardly through the outlet to the drain bed or to any suitable discharge. The inner compartment or tank is vented to the atmosphere thus providing a supply of oxygen to the filter bed at all times and due to the orientation of the outlet at the bottom of the inner compartment or tank, the filter will drain dry at all times and as the water drains out of the filter, air will take its place thus promoting growth of bacteria which along with an abundance of oxygen will effectively treat the effluent or liquids being discharged.

Another object of the present invention is to provide a combined septic tank and filter in which the filter is constructed in a cartridge form using polyethylene agates which are anywhere from 2 inches to 3 inches in size.

A further object of the present invention is to provide a combined septic tank and filter which is simple in construction, easy to install, efficient in operation, easy to maintain due to removability of components and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a transverse, plan sectional view taken substantially upon a plane passing along section line 2—2 of FIGURE 1 illustrating the orientation of the outer tank and inner tank compartment and the support arrangement therefor;

FIGURE 3 is a transverse, plan sectional view taken substantially upon a plane passing along section line 3—3 of FIGURE 1 illustrating the orientation of the spray pipes in relation to the filter; and FIGURE 4 is a detailed sectional view of the inlet pipe for the inner compartment or tank and showing the manner in which the spray pipe assembly is detachably connected to the upper end thereof.

Figure 1:
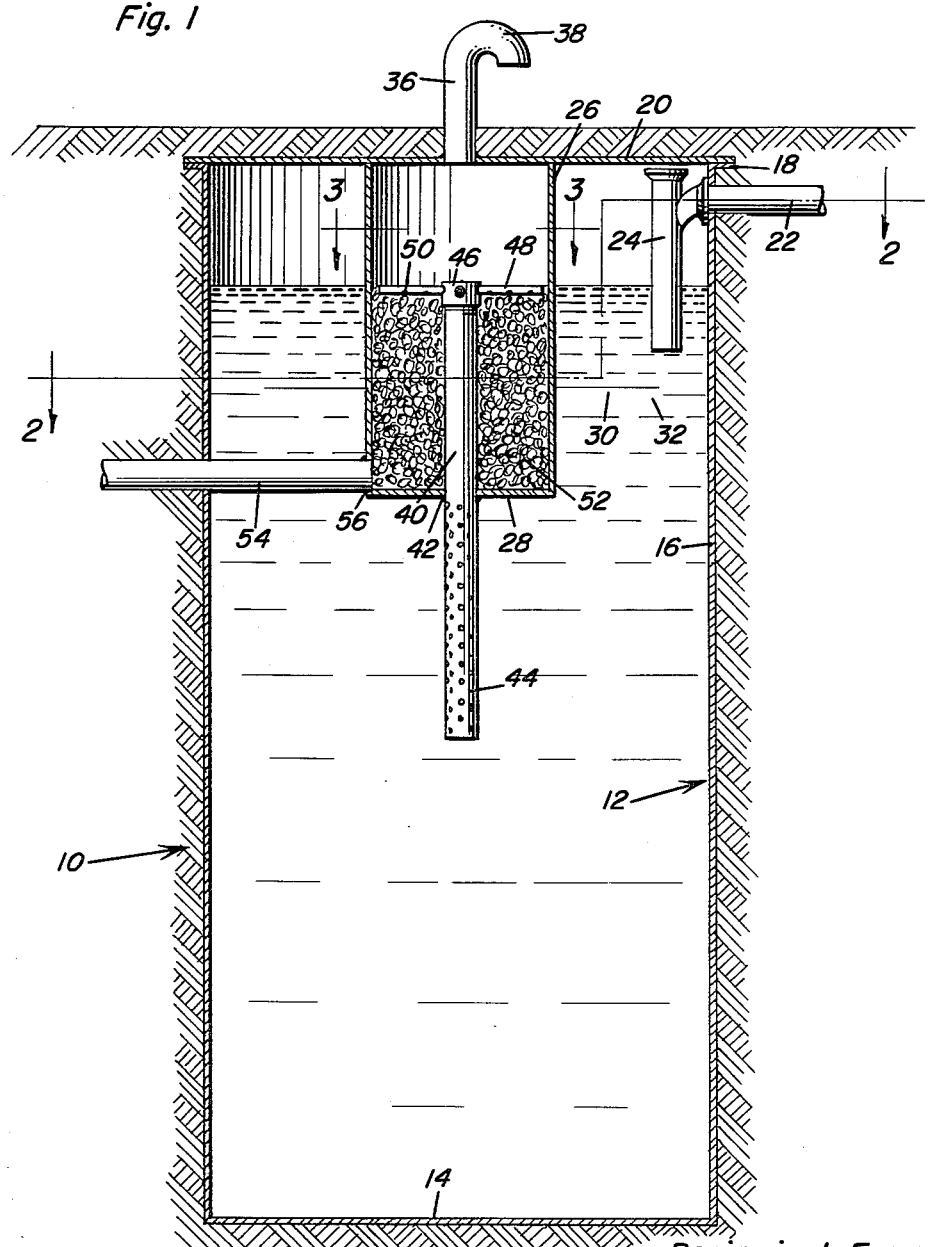
FIGURE 1 is a sectional view of the combined septic tank and filter of the present invention illustrating the orientation of components.

Referring now specifically to the drawings, the numeral 10 generally designates the combined septic tank and filter assembly of the present invention which includes an outer tank 12 including a bottom wall 14 and a peripheral wall 16 which may be of any suitable construction but which is illustrated as being cylindrical. The upper end of the wall 16 is provided with a projecting flange 18 for receiving a removable top or cap 20 which closes the tank 12.

Adjacent the upper end of the peripheral wall 16, a sewage inlet pipe 22 is provided and extends into the interior of the tank 12. The inlet pipe 22 is provided with a vertical down pipe 24 communicated therewith so that as the mixed solids and liquids are discharged into the tank 12 from the sanitary system of a house or the like, the solids will be disposed adjacent the top of the tank 12 and due to the usual bactericidal action, such solids will be broken down and liquified except that some of the solids will settle out as sludge at the bottom of the tank 12 in the usual manner of a septic tank.

Disposed concentrically within the tank 12 is a small cylindrical tank or compartment 26 which is also disclosed as cylindrical but which may be of other shapes. The small tank 26 is provided with a solid bottom 28 and is supported from the wall 16 of the tank 12 by a plurality of radially extending support or brace rods 30 which may be welded to the inner surface of the tank wall 16 as by welding 32 and also to the outer surface of the inner tank 26 as by welding 34. The upper end of the inner tank 26 is engaged with the removable top 20 and a vent pipe 36 extends through the top or cap 20 into the center of the upper end of the inner tank 26 thus communicating the inner tank 26 with the atmosphere and the vent pipe 36 is provided with a reversely curved upper end 38 for venting the inner tank 26.

The bottom 28 of the inner tank 26 is provided with a vertically elongated inlet pipe 40 extending therethrough and welded thereto as by welding 42. The lower end of the pipe 40 is provided with a plurality of radially extending apertures 44 above the closed bottom end which admits liquid into the pipe 40. The upper end of the pipe 40 is terminated intermediate the vertical height of the tank 26 and is provided with a spray head comprising an internally threaded and removable closure cap 46. Rigid with the closure cap and extending radially therefrom is a plurality of discharge pipes or spray pipes 48 which are arranged in perpendicular relation to each other and which are closed on the outer end and which are screw-threaded into the peripheral wall of the closure cap 46 thus communicating the interior of the spray pipe 48 with the interior of the vertical inlet pipe 40. The spray pipes 48 each have a plurality of longitudinally spaced discharge apertures 50 in the lower surface thereof for discharging the liquid in generally a spray pattern over substantially the entire area of the inlet tank 26.

Disposed below the spray pipe 48 and resting on the bottom 28 is a filter medium or cartridge 52 which is removable and which may be retained in any suitable retaining structure and which includes polyethylene agates from 2 to 3 inches in size.

Extending outwardly from the lower end of the peripheral wall of the inner tank 26 is a discharge pipe 54 welded to the inner tank 26 as by welding 56 and extending outwardly of the outer tank 12 to a suitable drain bed or other discharge area for discharging the effluent after it has passed through the filter bed. As the liquid is drained from the filter bed, air will be drawn into the same through the vent pipe 36 thus promoting the growth of bacteria and providing an abundance of oxygen thereby effectively treating the effluent so that a B.O.D. count of 70% removal is obtained.

It is noted that the inner tank extends below the region normally occupied by solids entering the tank 12 and the only way that liquid can be discharged into the inner tank 26 is through the vertical stand pipe 40 which will occur when the level of the liquid and solids in the tank 12 is elevated above the spray pipes 48 which would occur when material is discharged into the tank 12 from the soil pipe 22. By removing the lid or cap 20, the filter cartridge can be removed or the interior of the inner tank cleaned and if necessary, the cap 46 may be removed for this purpose.

While the dimensions may vary, it has been found that with a four inch inlet disposed four and one-half inches below the top of the tank 12, the spray pipe should be disposed substantially at the water level just below the inlet and the outlet pipe should be 18 inches below the removable top. A four inch inlet stand pipe is used and should extend to the central area of the water in the outer tank 12.

While polyethylene agates have been specifically described, it is within the purview of the present invention to use other materials or chemicals such as bone char and other similar materials. Also, if the installation requires a pumping apparatus may be connected to the filter outlet for emptying the filter so that air may replace the liquid therein. This apparatus could well be in the form of a syphon assembly connected to the outlet from the filter.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combined septic tank and filter assembly comprising an outer tank including a removable top wall, an inner tank suspended in the outer tank and engaged beneath the top wall thereof to be covered and closed thereby, said outer tank having a sewage inlet adjacent the upper end thereof and between the outer tank and the inner tank, said inner tank having a bottom drainage outlet pipe extending outwardly therefrom and out through the outer tank in sealed relation thereto, a vertical standpipe extending through the bottom of the inner tank and extending for approximately equal distances above and below the bottom of the inner tank, said standpipe having a plurality of perforations in the portion thereof extending below the bottom of the inner tank and being disposed substantially throughout the length thereof, said standpipe having a plurality of hollow pipes extending radially from the upper end thereof, each of said hollow pipes having a plurality of apertures therein for discharge of liquid over substantially the entire area of the inner tank, an air vent extending upwardly from the center of the top wall and communicating the top of the inner tank with the atmosphere for supplying oxygen to the inner tank, and relatively large aggregate filtering material disposed in the inner tank and completely filling the inner tank below the discharge pipes whereby the drain for the inner tank will normally retain the inner tank dry for filling of the inner tank with air from the atmosphere throughout the filter aggregate, and a plurality of radial braces extending between the inner and outer tank intermediate the ends of the inner tank for stabilizing the inner tank in relation to the outer tank.

2. A combined septic tank and filter comprising an outer tank including an open top, an inner tank mounted in the upper portion of the outer tank in spaced relation thereto and including an open top flush with said open top thereof, a common cover removably mounted on the tanks, said outer tank having a sewage inlet communicating therewith adjacent the top thereof, a vertical effluent pipe fixed, at an intermediate point, in the bottom of the inner tank and communicating same with the outer tank and having its ends spaced above the bottom thereof and below the cover, a removable filter medium in the lower portion of the inner tank encircling the pipe, a removable spray head on the upper end of the pipe overlying and engaged with the cartridge, and an outlet pipe connected to the lower portion of the inner tank, said spray head including a cap threaded on the upper end portion of the first named pipe, and a plurality of perforated discharge pipes threaded into the cap in communication therewith and radiating therefrom.

3. A combined septic tank and filter in accordance with claim 2, said first named pipe including an open lower end and having a multiplicity of perforations therein between said lower end thereof and the bottom of the inner tank.

4. The combination of claim 2, together with a ventilator comprising a gooseneck affixed to the cover and communicating the inner tank with the atmosphere.

References Cited in the file of this patent

UNITED STATES PATENTS

| | | |
|---|---|---|
| 1,002,089 | Sofleiss | Aug. 29, 1911 |
| 2,220,859 | Bispham et al. | Nov. 5, 1940 |
| 2,347,201 | Lindsay | Apr. 24, 1944 |
| 2,388,795 | Montgomery et al. | Nov. 13, 1945 |

FOREIGN PATENTS

| | | |
|---|---|---|
| 498,193 | Belgium | Jan. 15, 1951 |
| 680,608 | France | Jan. 22, 1930 |
| 1,004,557 | Germany | Mar. 14, 1957 |